UNITED STATES PATENT OFFICE 2,366,316

SOFTENING RUBBER

Arnold R. Davis, Old Greenwich, Conn., assignor to American Cyanamid Company, New York, N. Y., a corporation of Maine No Drawing. Application May 28, 1941,
Serial No. 395,543

6 Claims. (Cl. 260—761)

This invention relates to the treatment of rubber and more particularly to a method of treating rubber to obtain a product of increased softness or plasticity.

It is customary to mill crude rubber to effect a softening or breakdown thereof for the purpose of facilitating the subsequent processing (calendering, tubing, etc.) of the rubber or compounded rubber.

It is an object of the present invention to provide a process for accelerating the rate of breakdown of unvulcanized rubber and reducing the milling time over that customarily employed. It is a further object to provide a process for obtaining unvulcanized rubber of increased plasticity. It is an additional object to provide a new class of rubber plasticizing agents.

The foregoing objects may be accomplished in accordance with my invention by subjecting the unvulcanized rubber during the milling period to the action of a small amount of an aromatic sulfinic or sulfonic acid salt of an S-substituted isothiourea. These salts may be represented by the following general formula:

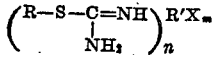

in which R is an alkyl radical containing at least three carbon atoms or an aromatic substituted alkyl radical, R' is an aromatic nucleus, X is $SO_2H$ or $SO_3H$ in which the sulfur atom is directly attached to carbon in the aromatic nucleus, and $n$ and $m$ are whole integers wherein $n$ is not greater than $m$ and preferably is equal thereto.

Methods for the preparation of the salts of the above general formula are known and described in the literature. See Donleavy, J. Amer. Chem. Soc., 58, 1004–5 (1936); and Veibel & Lillelund, Bull. Chim., Series 5, 5, 1153–58 (1938). The sodium or potassium salt of the aromatic sulfinic or sulfonic acid is reacted at low temperatures, e. g., room temperature, with the hydrobromide or hydrochloride of the desired S-substituted isothiourea. The reaction is carried out in solution, suitable solvents being water or aqueous alcohol, depending on the solubilities of the reactants. Methods for the preparation of the intermediate S-substituted isothiourea halides are also described in the literature; see Johnson & Sprague, J. Amer. Chem. Soc., 58, 1348–51 and 59, 1837–40 (1937).

In the salts of the above general formula, the alkyl radical attached to the sulfur atom of the isothiourea nucleus, whether substituted or not by an aromatic nucleus, may be saturated or unsaturated, branched or unbranched, or cyclo alkyl. Examples of suitable alkyl groups are n-propyl, isopropyl, t-butyl, isoamyl, n-hexyl, 1-methylheptyl, cetyl, stearyl, allyl, cyclohexyl, etc., and of aromatic substituted alkyl groups, benzyl, beta-phenylethyl, phenylcyclohexyl, styryl, alpha-methylstyryl, etc.

The aromatic sulfo acid which may be combined with the substituted isothioureas to form the salts coming within the present invention may be mono- or polysulfinic or sulfonic acids in which the sulfo acid group or groups are directly attached to carbon of the aryl nucleus. The aryl nucleus may be any aromatic hydrocarbon which is soluble in or compatible with rubber, for example, benzene, naphthalene, anthracene, diphenyl, etc., although benzene and naphthalene are preferred. The aryl nucleus may contain substituents on the ring which do not adversely affect, or only very slightly so, the plasticizing capacity of the salts, for example, alkyl, alkoxy, cycloalkyl, aryloxy, hydroxy, halogen, nitro groups, etc., and weakly basic groups such as secondary amino groups. Strongly basic groups such as the primary amino groups are to be avoided because, in general, they have a tendency to act as anti-plasticizers of rubber and also as accelerators of the vulcanization of rubber.

Where a plurality of the sulfo acid groups is present on the aryl nucleus, each such group may be combined with an equivalent of the same or of a different substituted isothiourea. In such instances, mixed salts will be obtained. There may also be employed as plasticizers, mixed salts in which at least one of the sulfo acid groups is combined with a substituted isothiourea and the remainder with a metal or salt-forming inorganic group which will not adversely affect the aging quality of the vulcanized rubber, for example, the alkali and alkaline earth metals, ammonia, zinc, aluminum, cadmium, tin, or with an organic base such as diphenyl guanidine. A further group are the acid salts which, however, are somewhat less suitable due to the known instability of the sulfinic acid group and the capacity of free acids, in general, to retard the vulcanization of rubber. They may be used, however, where the presence of a free acid group is not undesirable.

In general, the plasticizing activity of the salts will vary with the substituent attached to the sulfur atom of the isothiourea nucleus. On the basis of the sulfo acid employed for the formation of the salt, the aryl sulfinic acid salts will have the greater plasticizing activity. The preferred group of salts are, therefore, the aromatic sulfinic acid salts of the substituted isothioureas of the class described and more particularly S-(1-methyl-heptyl) isothiourea p-toluene sulfinate.

For maximum gain in plasticity, the plasticizing agent is added to the rubber as early as possible in the milling operation, such as just after the preliminary milling or knitting together of the rubber, and preferably in the absence of compounding ingredients, especially amounts of sulfur commonly used in vulcanizing rubber. In general, the amount of plasticizing agent to be added will not be much above about 1% on the weight of the rubber, for example, about 0.375%. Larger amounts may be used if desired but without proportionate increase in plasticizing effect. The plasticizing agents may be used singly or more than one may be added to the rubber, either separately or in admixture.

The plasticizing agents will be more effective at elevated temperatures, e. g., above about 50° C. Any temperature to which rubber may be heated without detrimental effect may be used, for example, up to about 160° C. Time of milling, as well as the temperature, is a factor in determining the extent to which the rubber will be plasticized, the longer the milling period the greater the plasticity.

The invention is further illustrated by the following specific examples to which, however, it is not to be limited. The softening effect of the compounds on the rubber in these examples was determined in accordance with a modification of the well-known Zimmerman & Cooper method, Ind. & Eng. Chem., 20, 812 (1928). The plasticity measurements were made in a Williams plastometer at 100° C. using a 3 minute "Y" value.

Example 1

Four hundred and twenty grams of smoked sheet rubber was milled on a 12-inch mill for five minutes at an average temperature of 95° C., after which 20 grams of the rubber was removed for purposes of the test. To the 400 grams of rubber on the mill was added, as plasticizing agent, 1.5 grams (0.375%) of S-(1-methylheptyl) isothiourea p-toluene sulfinate. The plasticizing agent was then milled into the rubber for five minutes. The percentage increase in softness of the rubber due to the plasticizing agent was 19.

Example 2

Following the procedure of Example 1, 1.5 grams of S-(1-methylheptyl) isothiourea p-toluene sulfonate as the plasticizing agent was milled into the rubber. The percentage increase in softness of the rubber due to the action of the plasticizing agent in this instance was 14.6.

In like manner, S-t-butyl isothiourea p-toluene sulfinate and the sulfonate; S-isoamyl isothiourea p-toluene sulfinate and the sulfonate and S-n-hexyl isothiourea p-toluene sulfinate and the sulfonate were also found to plasticize the crude rubber, but to a lesser degree.

Rubber which has been plasticized in accordance with the invention may be compounded and vulcanized in known manner. In general, the vulcanized stocks will reflect in the form of better physical properties, e. g., tensile, the beneficial effect of the reduced mechanical working of the rubber.

The plasticizing agents may be employed in the preparation of rubber cements, preferably by dissolving in a suitable solvent the unvulcanized rubber which has been softened by milling with one or more of the salts of the class described. Alternatively, the unvulcanized rubber may be dissolved in a solvent to which one or more of the plasticizing agents have already been added, or the latter may be added to the solution of the rubber in the solvent. Either of the latter methods, however, would be much slower in producing the rubber cement.

Suitable variations and changes in the invention may be made without departing from the spirit thereof or the scope of the appended claims.

I claim:

1. A process of increasing the plasticity of rubber which comprises, subjecting unvulcanized rubber to the action of a small amount of S-(1-methylheptyl) isothiourea p-toluene sulfinate for a time sufficient to effect an increase in the plasticity of the rubber over that which the rubber would have if subjected to the same conditions in the absence of said salt.

2. Unvulcanized rubber of increased plasticity comprising rubber admixed with a small amount of S-(1-methylheptyl) isothiourea p-toluene sulfinate.

3. A process for increasing the plasticity of rubber which comprises milling unvulcanized rubber in the presence of a small amount of a salt of a substituted isothiourea represented by the following general formula:

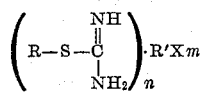

in which R is a member of the group consisting of the alkyl radicals containing at least three carbon atoms and aromatic substituted alkyl radicals in which the aromatic substituent is selected from the group consisting of the benzyl, phenylethyl, phenylcyclohexyl, styryl and methyl styryl radicals; R' is an aromatic hydrocarbon; X is a member of the group consisting of the —SO₂H and —SO₃H radicals in which a sulfur atom is directly attached to a carbon atom in the aromatic nucleus and n and m are the same integers from 1 to 2; for a sufficient length of time to effect an increase in the plasticity of the rubber over that of which the rubber would have if subjected to the same conditions in the absence of said salt.

4. A process of increasing the plasticity of rubber which comprises milling unvulcanized rubber in the presence of a small amount of a neutral salt of a substituted isothiourea represented by the following general formula:

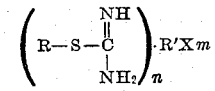

in which R is a member of the group consisting of the alkyl radicals containing at least three carbon atoms and aromatic substituted alkyl radicals in which the aromatic substituent is selected from the group consisting of the benzyl, phenylethyl, phenylcyclohexyl, styryl and methyl styryl radicals; R' is an aromatic hydrocarbon; X is a member of the group consisting of the —SO₂H and —SO₃H radicals in which a sulfur atom is directly attached to a carbon atom in the aromatic nucleus and n and m are the same integers from 1 to 2; the milling being carried out for a time sufficient to effect an increase in the plasticity of the rubber over that which the rubber would have if subjected to the same conditions in the absence of said salt.

5. Unvulcanized rubber of increased plasticity comprising rubber milled with a small amount of the salt of a substituted isothiourea represented by the following general formula:

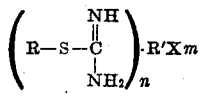

in which R is a member of the group consisting of the alkyl radicals containing at least three carbon atoms and aromatic substituted alkyl radicals in which the aromatic substituent is selected from the group consisting of the benzyl, phenylethyl, phenylcyclohexyl, styryl and methyl styryl radicals; R' is an aromatic hydrocarbon; X is a member of the group consisting of the —SO₂H and —SO₃H radicals in which a sulfur atom is directly attached to a carbon atom in the aromatic nucleus and $n$ and $m$ are the same integers from 1 to 2.

6. Unvulcanized rubber of increased plasticity comprising rubber milled with a small amount of the neutral salt of a substituted isothiourea represented by the following general formula:

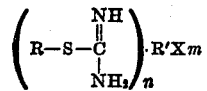

in which R is a member of the group consisting of the alkyl radicals containing at least three carbon atoms and aromatic substituted alkyl radicals in which the aromatic substituent is selected from the group consisting of the benzyl, phenyl ethyl, phenyl cyclohexyl, styryl and methyl styryl radicals; R' is an aromatic hydrocarbon; X is a member of the group consisting of the —SO₂H and —SO₃H radicals in which a sulfur atom is directly attached to a carbon atom in the aromatic nucleus and $n$ and $m$ are the same integers from 1 to 2.

ARNOLD R. DAVIS.